Apr. 17, 1923.
W. N. HOBBS
1,451,826
DEVICE FOR WEIGHING ANIMALS AND FOR INDICATING DOSAGE
Filed March 25, 1919 2 Sheets-Sheet 1
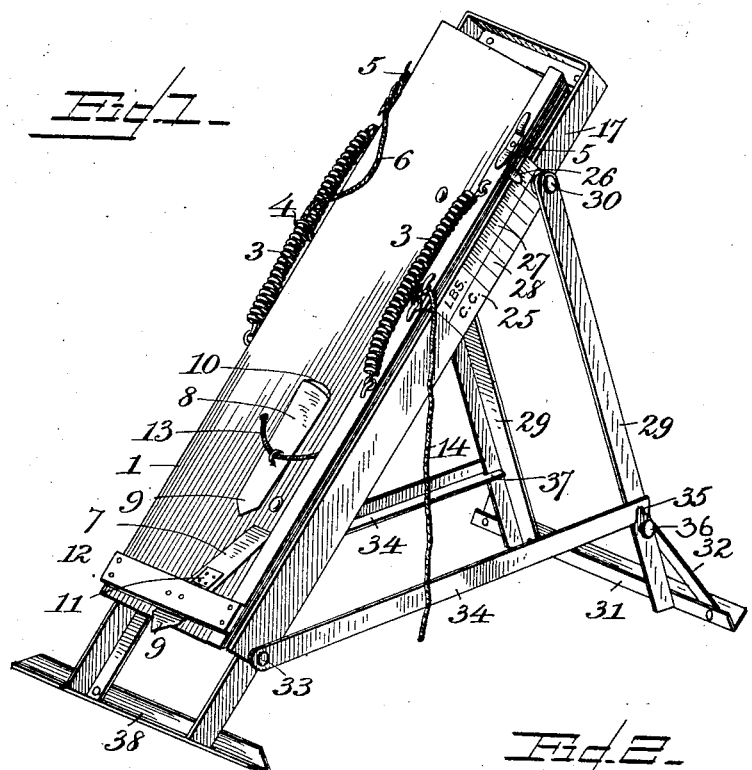
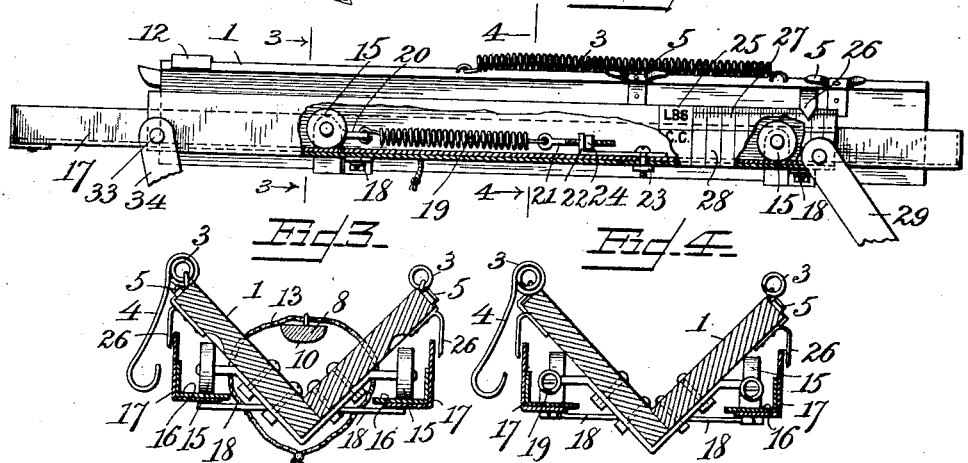
WITNESSES
W. N. Hobbs
INVENTOR
BY
ATTORNEY

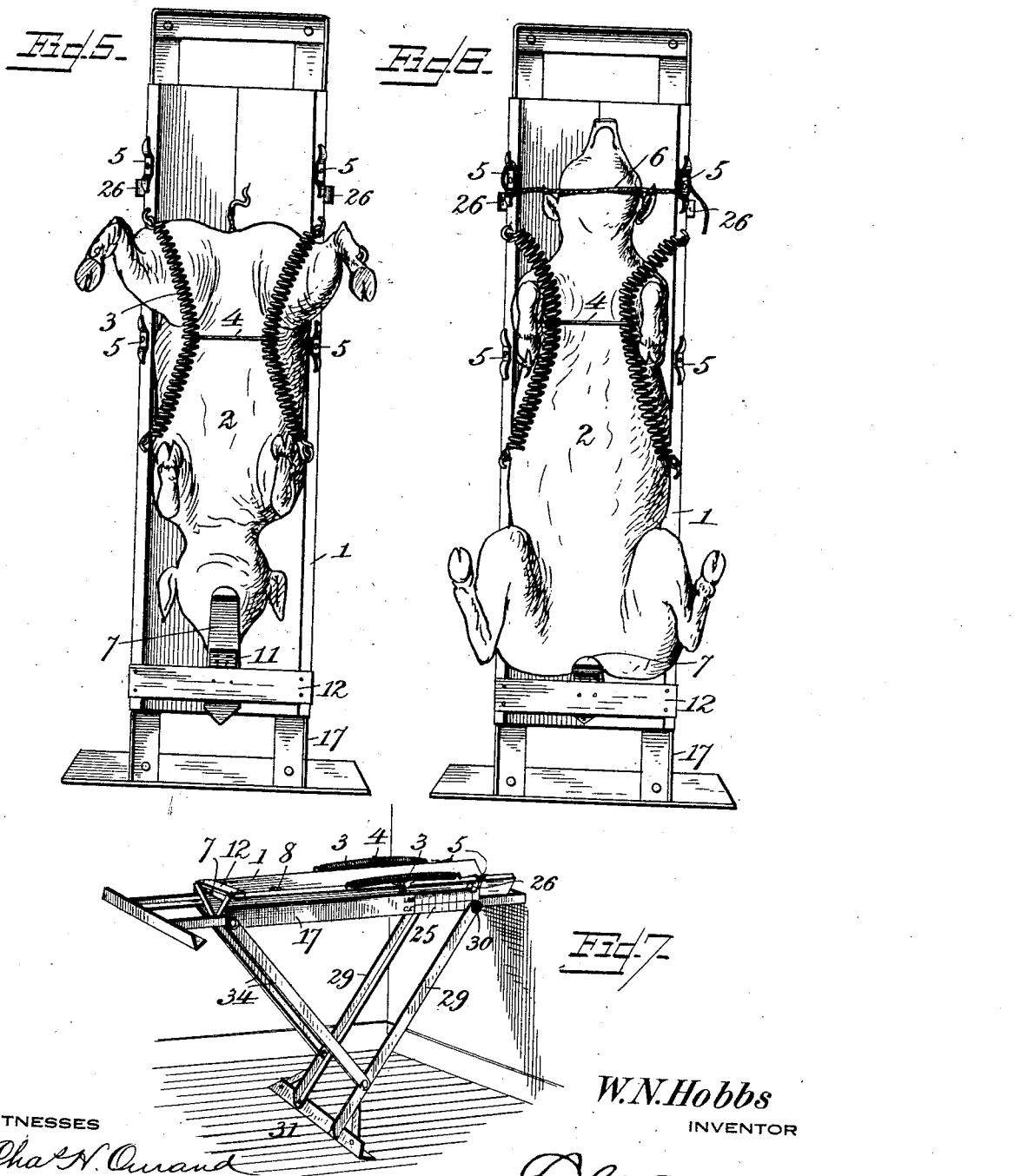

Patented Apr. 17, 1923.

1,451,826

UNITED STATES PATENT OFFICE.

WILLIAM N. HOBBS, OF KENSINGTON, KANSAS.

DEVICE FOR WEIGHING ANIMALS AND FOR INDICATING DOSAGE.

Application filed March 25, 1919. Serial No. 284,914.

*To all whom it may concern:*

Be it known that I, WILLIAM N. HOBBS, a citizen of the United States, residing at Kensington, in the county of Smith and State of Kansas, have invented a new and useful Device for Weighing Animals and for Indicating Dosage, of which the following is a specification.

This invention has reference to devices for weighing either animals or material, but more particularly weighing hogs and for indicating the amount of serum to be injected to immunize the hogs against hog cholera.

The object of the invention is to provide means whereby the hog is firmly held on the weighing device and the amount of serum is indicated so that the injection may be given while the hog is still on the weighing device.

The invention comprises a support which may be of trough shape and which may be supported in a slanting position or in a horizontal position at will and when in a slanting position will indicate the weight of the hog and at the same time indicate the amount of serum needed, the weight of the animal and the amount of serum being proportionate. Provision is made for the easy movement of the movable parts and for effectively fastening the animal in position.

The invention will be best understood from a consideration of the following detailed description taken in connection with the accompanying drawings forming a part of this specification, with a further understanding that while the drawings show a practical form of the invention, the latter is not confined to any exact conformity with the showing of the drawings but may be changed and modified so long as such changes and modifications come within the scope of the appended claims.

In the drawings—

Figure 1 is a perspective view of the device.

Figure 2 is a side elevation, with some parts broken away and shown in section, the supporting frame being omitted.

Figure 3 is a section on the line 3—3 of Figure 2.

Figure 4 is a section on the line 4—4 of Figure 2.

Figure 5 is a plan view of the device in use, showing one position of the parts with respect to the animal.

Figure 6 is a view similar to Figure 5, showing another position of the parts with respect to the animal.

Figure 7 is a perspective view, showing an arrangement of the device with the animal-supporting trough level.

Referring to the drawings, there is shown a trough or carrier 1 which may be V-shaped, or approximately so, in cross section or of any other suitable shape for receiving an animal, such as a hog indicated at 2 in Figures 5 and 6.

A V-shaped or similarly constructed trough is well adapted to support an animal such as a hog upon its back. At opposite sides of the edges of the trough are elongated springs 3 fast at each end and provided at an intermediate point with a connecting link 4 whereby the springs may be approached to partially embrace the body and legs of the animal, either the fore legs as shown in Figure 6 or the hind legs as shown in Figure 5, thereby effectively holding the animal upon its back in the trough. At other points along the side edges of the trough there are provided cleats 5 for the application of a rope or strand 6 to further secure the animal in the trough, one application of the strand being indicated in Figure 6 to hold the head of the animal in the bottom of the trough to thereby prevent excessive struggling. There are also provided devices 7 and 8 of like construction, each device being in the form of an elongated strip with one end 9 tapered both in width and thickness to conform to the bottom of the trough, and the surface of the strip toward the bottom of the trough rounded as shown at 10. The strip 7 is secured about midway of its length by a hinge 11 to a cross strip 12 fast to the sides of the trough and extending from one side to the other. The strip 8 is secured to the trough by a flexible strand 13 which may be carried loosely through the sides of the trough to give more or less play to the strip 8. The strip 7 when the animal is on its back in the trough may engage over the head end of a large animal as shown in Figure 5 or over the hindquarters of the animal as indicated in Figure 6. The strip 8 may be utilized in like manner for small animals. When a large animal is occupying the trough the strip 8, because of the flexibility of the guard or rope 13, will lodge in the bottom of the trough under the animal. In Figure 1 there is shown a rope or strand 14 in addition to the rope 6, thus permitting holding or binding of the animal in the trough in addition to the springs 3, such additional fastenings being at times advisable.

The trough is provided at spaced points with rollers 15, shown in Figs. 2, 3, and 4, or any other means serving as an anti-friction support for the trough, and these rollers are arranged to travel upon tracks 16 which may be in the form of angle strips carried by an elongated frame 17 under-riding the tracks 16 and to which the tracks are secured in any appropriate manner. The frame 17 may also be of angle material thereby contributing to strength and lightness. Fast to the end face of the trough are guide fingers 18 under-riding the frame 17 so that the rollers 15 are kept on the track. The length of the frame 17 and the length of the trough 1 are so proportioned that the trough may move lengthwise of the frame for a suitable distance to permit the trough to yield proportionately to the weight of the animal and thereby determine such weight. To accomplish this springs 19 are arranged on opposite sides of the trough within channels defined by the trough and the frame 17, one end of each spring being made fast to an ear 20 on the trough and the other end made fast to an eyebolt 21 passed through a bracket 22 secured to the track 16 by bolt 23 or in any other appropriate manner. The bolt 21 is provided with a nut 24 whereby it may be adjusted lengthwise in the bracket 22 and thereby impart desirable tension to the spring 19. Thus the weighing may be made correct even after the springs lose some of their original strength and each spring may be tensioned independently.

Fast to the sides of the frame 17 are index plates 25 and fast to the trough 1 are fingers or pointers 26 in operative relation to the index plates, the scale 27 indicating weight, say pounds, and the scale 28 indicating volume, say cubic centimeters.

In order to support the trough and the carrying frame 17 therefor one end of the frame 17 has a leg frame 29 joined thereto by pivots 30. The leg frame is provided with a transverse foot member 31 fast thereto and made rigid therewith by braces 32, the foot member being wider than the leg frame to impart stability to the structure. Secured to the frame 17 by pivots 33 located near that end of the frame 17 remote from the pivots 30 are bars 34. These bars at their free ends are provided with notches 35 to form hooks so arranged as to engage over studs 36 fast to the leg frame 29 near the foot 31. Both the leg frame 29 and the bars 34 are made of angle material. One web of each bar 34 contains notch 35 and the other web is continued as a finger 37 spaced from the first named web to engage over that web of the corresponding leg frame member carrying the stud 36. This makes a particularly firm connection so that when the parts are engaged there is provided a tri-angular frame with the leg frame 29 somewhat slanting out of the vertical position and the frame 17 slanting to a greater extent with the foot 31 and another foot 38 constituting the lower end of the frame 17, spread apart. When the frame 17 and leg frame 29 are assembled as described the trough 1 is supported at a suitable angle in slanting position whereby the weight of the hog is borne by the springs 19. The result is that the springs 19 will stretch to a commensurate extent which is indicated by a movement of the fingers 26 along the scales 27 and 28, there being two such scales and fingers on opposite sides of the device so that the readings may be taken from either side of the device. The scale 27 is intended solely as a weighing indication while the scale or index 28 shows the amount of serum constituting a dose, since such amount of serum is directly proportional to the weight of the animal.

In Figure 1 the device is shown as resting upon a floor or other support with both feet 31 and 38 supporting the device. For some purposes it is advisable to have the trough horizontal or approximately so, say when injecting the serum, and in such event the supporting frame may be tilted from the position shown in Figure 1 so as to be upheld solely by the foot 31 while the end of the frame 17, remote from the foot 38, engages a wall or other abutment, as shown in Figure 7.

The supporting part of the device may be folded flat or nearly flat against the frame 17 when the bars 34 are disconnected from the leg frame 29. Under such circumstances the frame 17 can be laid flat upon the floor or ground and the hog may be placed upon his back in the trough and there secured in the manner already described. Then the frame 17 may be lifted to a suitable slanting position and secured in such position by means of the bars 34 connecting with the leg frame 29 and holding the latter firmly in position so that the whole structure is raised to a suitable weighing position with the hog so secured in place as to have no opportunity to struggle to an extent which will materially affect the accuracy of the weighing. When the weighing operation is completed, and this is quickly accomplished, the device is moved to the position shown in Figure 7 which is a convenient position for injecting the quantity of serum indicated by the scale 28.

In the foregoing description particular reference has been made to the use of the device with reference to hogs and the immunizing of the hogs against hog cholera by injections of a suitable serum, thus permitting owners or raisers of hogs to perform the immunizing procedure without needing any particular skill for the purpose, the device itself supplying the necessary data and also providing a means for holding the hog while the serum is being injected.

It is to be understood, however, that the invention is not confined in its usefulness to the immunizing of hogs with respect to hog cholera but may be used for other purposes including the weighing of other animals than hogs and of things other than animals. Furthermore, the device may be used as an operating table for veterinary purposes.

What is claimed is:

1. In a device for the purpose described, an inclinable support for an animal to hold the animal in an inclined position, said support having upholding and weighing means to maintain it free and yieldable to the weight of the animal to predetermined extents, and means associated with the support and operable thereby to indicate on a scale the dosage for the animal being weighed corresponding to the weight of the animal.

2. In a device of the character described, a substantially triangular supporting frame, an animal holding trough slidable along one of the sides of the frame, and weighing means in connection with the frame and trough and operated by the sliding of said trough, said frame being tiltable so that the trough may assume either a weighing position or a position convenient for veterinary operations.

3. In a device for the purpose described, an elongated supporting member adapted to receive and sustain an animal and movable under the weight of the animal in a downwardly inclined path, means on the support for securing an animal thereon, and restraining means for the support yieldably resistant to the movement thereof under the weight of the animal and for indicating such weight.

4. In a device for the purpose described, an elongated supporting member adapted to receive and sustain an animal and movable under the weight of the animal in a downwardly inclined path, means on the support for securing an animal thereon, restraining means for the support yieldably resistant to the movement thereof, and a scale associated with the movable animal support and having its pointer actuated by the movement of said support, said scale being calibrated to indicate dosage dependent upon the weight of the animal.

5. In a device for the purpose described, a supporting frame, a carrier supported thereon so as to be movable under the weight of the animal in a downwardly inclined path, means connected with the carrier and yieldingly resistant to the movement of the carrier through the inclined path to predetermined extents corresponding to the weight of the animal on the carrier and for indicating such weight and means for holding the animal on its back on the carrier.

6. In a device for the purpose described, a substantially triangular supporting frame adapted to stand with its apex uppermost, a trough-shaped carrier mounted on one of the slanting sides of the frame and movable therealong, yieldable restraining means for the carrier responsive to predetermined extents to the weights of animals on the carrier, and correlated index means showing the weight of the animal and the dosage of a remedy to be given the animal in accordance with such weight, said index means being connected to and operated by the movement of said carrier.

7. In a device for the purpose described, a substantially triangular supporting frame, adapted to stand substantially upright, a carrier on and movable along one of the inclined sides of the frame, restraining means for the carrier yieldable to different extents to different weights, means on the carrier for confining an animal thereon and means connected to and operated by the movement of said carrier for indicating the quantity of a remedy to be given the animal in accordance with the weight of the animal.

8. In a device for the purpose described, a supporting frame having a carrier mounted thereon to move along a downwardly inclined path under the weight of an animal placed on the carrier, restraining means for the carrier yieldable to different extents under different weights and holding means on the carrier for the animal including elongated pivoted means located at the lower end of the carrier and adapted to be arranged longitudinally of the carrier to engage the portion of the animal there located.

9. In a device for the purpose described, a supporting frame having a carrier mounted thereon to move along a downwardly inclined path under the weight of an animal placed on the carrier, restraining means for the carrier yieldable to different extents under different weights and holding means on the carrier for the animal including elongated pivoted means located at the lower end of the carrier to engage the portion of the animal there located, said elongated pivoted means being in spaced relation to the sides and arranged lengthwise of the carrier.

10. In a device for the purpose described, a weighing carrier having an inclined operative position and provided with weighing means yieldable to predetermined extents, said carrier having yieldable holding devices for engaging the body of an animal placed upon the carrier and yieldable holding means for engaging one end of the animal.

11. A device for the purpose described, comprising an elongated trough-shaped carrier constituting a weighing member for an animal and arranged in an inclined position in operation, said trough-shaped carrier having weighing means therefor yieldable to predetermined extents to different weights, and yieldable holding means for an animal laid in the trough-shaped carrier, applied to the carrier on opposite sides thereof and arranged to over-lie the body of the animal.

12. A device for the purpose described, comprising an elongated trough-shaped animal carrier having an inclined position in use, restraining means for the carrier yieldable to predetermined extents under the weights of animals placed on the carrier, cleats on opposite sides of the carrier for the attachment of fastening ropes thereto, elastically yieldable means extended along opposite sides of the carrier and provided with intermediate connecting means whereby the yieldable fastening means may be brought toward each other over an animal on the carrier and elongated fastening means at the lower end of the carrier for engaging over that portion of the animal located at the lower end of the carrier.

13. A device for the purpose described, comprising a substantially triangular frame, an elongated trough-shaped carrier mounted on one side of the frame to have an inclined position thereon, said carrier having an extent of longitudinal movement along the frame, weighing springs between the carrier and frame, means on the carrier for holding an animal on said carrier, and indicating means mounted in part on the carrier and part of the frame for showing the weight of an animal placed thereon and for designating the dosage of a remedy to be given the animal in accordance with the weight of the animal.

14. A device for the purpose described, comprising a sustaining structure, an animal receiving carrier on the structure and capable of being located in a downwardly inclined position for movement under the weight of the animal in the direction of the lower end of said carrier, weighing means between the animal carrier and the sustaining means for indicating the weight of the animal on the carrier, and also the dosage of a remedy to be given to the animal in accordance with such weight and means for holding the animal on the carrier with either the head or tail end of the animal toward the lower end of the carrier.

15. A device for the purpose described, comprising a sustaining structure, an animal receiving carrier on the structure and caapable of being located in a downwardly inclined position for movement under the weight of an animal thereon in the direction of the lower end of said carrier, weighing means between the animal carrier and the sustaining means for indicating the weight of the animal on the carrier, and means for holding the animal on the carrier with either the head or tail end of the animal toward the lower end of the carrier, said holding means including an elongated strip at the lower end of the carrier hingedly connected to the carrier to move about an axis transverse of the carrier.

16. A device for the purpose described, comprising a sustaining structure, an animal receiving carrier on the structure and capable of being located in a downwardly inclined position for movement under the weight of an animal thereon in the direction of the lower end of said carrier, weighing means between the animal carrier and the sustaining means for indicating the weight of the animal on the carrier, and means for holding the animal on the carrier with either the head or tail end of the animal toward the lower end of the carrier, said holding means including an elongated strip at the lower end of the carrier hingedly connected to the carrier to move about an axis transverse of the carrier, and said holding means also including elongated elastic means on opposite sides of the carrier at higher points thereon than the first-named holding means and each having its ends connected to the same side of the carrier and a joining connection at an intermediate point of one of the elastic holding means for engagement with a like point of the other holding means, whereby said second-named holding means are caused to approach in overlying relation to the body of the animal and in embracing relation to leg portions of the animal.

17. A device for the purpose described, comprising a basic supporting member and an elongated animal carrier mounted on the basic member for location in a downwardly inclined position, antifriction devices on the animal carrier in engaging relation to parts of the basic support for movement therealong, means for retaining the animal carrier in engagement with the basic support while moving therealong, fastening means for holding the animal on the carrier, and coacting weighing means on the basic support and carrier for indicating the weight of the animal and also the dosage of a remedy to be given the animal by movements of the carrier under such weight.

18. In a device of the character described, a substantially triangular supporting frame, an animal holding member slidable along one of the sides of the frame, weighing means on said frame and said member, said frame in its normal position holding the member in an inclined position, and said frame being tiltable whereby said member may be held in a horizontal position above the ground and being collapsible whereby the member may be lowered to the ground.

19. In a device for the purpose described, a supporting frame, a carrier mounted on and movable relatively to said frame, weighing and dosage indicating means actuated by the movement of the carrier, and means for confining an animal on the carrier flat on its back with either the head or tail end of the animal toward one end of the carrier, said confining means including yieldable means at each side of the carrier to engage about the legs of the animal.

20. In a device for the purpose described, a supporting frame, a carrier mounted on and movable relative to said frame, weighing and dosage indicating means actuated by the movement of the carrier, and means for confining an animal on the carrier flat on its back with either the head or tail end of the animal toward one end of the carrier, said confining means including a strip elongated in the direction of the carrier to engage with either the head or hind quarters of the animal.

21. In a device for the purpose described, a supporting frame, a carrier mounted on and movable relative to said frame, weighing and dosage indicating means actuated by the movement of the carrier, and means for confining an animal on the carrier flat on its back with either the head or tail end of the animal toward one end of the carrier, said confining means including two elongated strips in spaced relation to each other, both being flexibly mounted on the carrier.

22. In a device for the purpose described, a supporting frame, a carrier mounted on and movable relative to said frame, weighing and dosage indicating means actuated by the movement of the carrier, and means for confining an animal on the carrier flat on its back with either the head or tail end of the animal toward one end of the carrier, said confining means including devices to engage the legs as well as either the head or hind quarters of the animal.

23. In a device for the purpose described, a supporting frame, a carrier mounted on and movable relative to said frame, weighing means actuated by the movement of the carrier, and means for confining an animal on the carrier flat on its back with either the head or tail end of the animal toward one end of the carrier, said confining means including longitudinal springs at each side of the carrier to engage about the legs of the animal.

24. A device for the purpose described, comprising an elongated animal carrier, restraining means for the carrier yieldable to predetermined extents under the weights of animals placed on the carrier, weighing and dosage indicating means actuated by the movement of the carrier, elastically yieldable means extending along opposite sides of the carrier and provided with intermediate connecting means whereby the yieldable means may be brought toward each other over an animal on the carrier.

25. A device for the purpose described, comprising a sustaining structure, an animal receiving carrier mounted on the structure for movement under the weight of an animal thereon toward the lower end of said carrier, weighing means between the animal carrier and the sustaining means for indicating the weight of the animal on the carrier, and means for holding the animal on the carrier, said holding means including elongated elastic means on opposite sides of the carrier and each having its ends connected to the same side of the carrier, and a joining connection at an intermediate point of one of the elastic holding means for engagement with a like point of the other holding means, whereby said holding means are caused to approach in overlying relation to the body of the animal and in embracing relation to leg portions of the animal.

26. A device for the purpose described including a substantially triangular collapsible structure, comprising an elongated frame forming one side of the structure, a leg member pivoted at one end to the frame near one end thereof and provided with a transverse foot member at the other end, and connecting bars pivoted at one end to the frame near the other end of the latter and provided with hook connections to the leg member near the foot end thereof, a carrier mounted on the frame to move lengthwise thereof, and weighing means between the carrier and the frame on which it is mounted whereby, when the frame and carrier are in an inclined position, the weight may be ascertained.

27. In a device of the character described, a substantially triangular supporting frame, supported with its apex uppermost, a carrier mounted on one of the inclined sides of the frame and movable along the same, and weighing means actuated by the movement of the carrier, said frame being tiltable so that the carrier may assume either an inclined position or a horizontal position, in which latter position the weighing means is inactive.

In testimony, that I claim the foregoing as my own, I have hereto affixed my signature.

WILLIAM N. HOBBS.

Witnesses:
BLAINE A. RANDALL,
H. WESTERMAN.